UNITED STATES PATENT OFFICE.

WILLIAM P. M. GRELCK, OF EVANSTON, ILLINOIS, ASSIGNOR TO BERTHA H. GRELCK, OF LINCOLN, NEBRASKA.

SELF-PRESERVING ACID MILK PRODUCT AND PROCESS OF MAKING THE SAME.

1,230,479.     Specification of Letters Patent.     Patented June 19, 1917.

No Drawing.     Application filed May 10, 1915.    Serial No. 27,022.

*To all whom it may concern:*

Be it known that I, WILLIAM P. M. GRELCK, a citizen of the United States, residing at the city of Evanston, in the county of Cook and State of Illinois, have invented certain new and useful Improvements in Self-Preserving Acid Milk Products and Processes of Making the Same, of which the following is a specification.

My invention relates to the production of food products from milk which has been soured, and especially from buttermilk from which the fats have been taken, and which therefore is practically a waste product of the butter manufacturer. Many attempts have been made in the past to utilize in portable and convenient form this great source of food material, but until now no practical means of producing a wholesome, edible product has been discovered.

In order that the difficulties to be met may be understood as well as the means by which I have succeeded in overcoming them, I will say briefly: Normal milk, even when called "sweet" has an acid reaction. The acidity thereof increases with keeping, as the result of the formation of lactic acid. Allowing the development therein of lactic acid bacilli—a change which is facilitated by moderate heat. When the lactic acid amounts to about $\tfrac{3}{10}$ of one per cent. in volume, the casein begins to be precipitated, an action which proceeds more rapidly as the temperature is raised to moderate but not sterilizing heat. In the first steps of separation the casein appears as a slight flocculent precipitate. As the precipitation continues a soft gelatinous mass or curd is formed, the consistency of which gradually increases while it retains the same general characteristics, until a temperature of about 120 degrees Fahr., is reached, when the character of the mass undergoes a radical change. The physical change is marked, and this is probably due to an extensive chemical change as well. It is not to be understood that the changes stated occur in a fixed, definite and unvarying manner. They vary according to the amount of acidity in the milk, the temperature at which and the length of time during which heat is applied; and perhaps with local atmospheric conditions. But, and subject to special variations, the foregoing sets out the general changes which take place while milk is passing from a sweet condition to that at which is formed a homogeneous insoluble curd of coagulated casein precipitate.

Owing to the conditions stated, the sour milk products made or attempted have heretofore fallen into two classes: In one class a high enough degree of heat is directly applied to precipitate, coagulate, cook and dry the casein. The milk albumen, sugar and mineral salts may thus be retained if desired, but the product is left in solid, homogeneous masses, which, from their character and size, resist the action of the gastric juices thereon. Moreover, the product is insoluble, except in the presence of weak alkalis or strong acids, neither of which conditions obtains in the normal processes of animal digestion. This material therefore is not fit for food, but is only adapted for use in certain of the mechanical industries. On the other hand, the attempts which have been made to prepare acceptable food products have taken account of the refractory character of casein when coagulated in masses according to the nature thereof, and, have sought to use the precipitated casein, stopping short of the heat necessary to coagulate or to cook it. And the heat actually used therefore was not sufficient to sterilize or pasteurize the material. The result has been a raw unstable product, in which the action of lactic and other bacilli is continuous and which is comparatively unfit for food consumption. And when the whey is withdrawn from the mass before drying, as is usually done when these methods are followed, the milk albumin, milk sugar and mineral salts are in large part lost. The attempt has been made to overcome the coagulation of the casein in large masses by introducing foreign matter, such as wheat flour, only with the result of adding an incongruous element without attaining the practical end of a nutritious and wholesome food. Moreover, these low temperature methods are slow, thereby unduly developing the acidity of the product and the expense of manufacture.

It is the object of my invention to produce a food product of definite acidity, to so treat the soured milk or buttermilk as to cause the casein to precipitate and finally be fixed in very finely separated non-adherent particles, to also coagulate the albumin and preserve it, together with the milk sugar and other mineral salts of the resulting product; in fact, to preserve all the constituents of the milk operated upon, except the water of solution, and moreover, to leave such product in a sterilized condition and containing the elements of self preservation. It is thoroughly cooked and will be found a wholesome and readily digested food. It can moreover be made so economically and in such quantities as to be available for feeding to poultry and the lower animals.

In the practice of my invention, I prefer to have about $\frac{6}{10}$ of one per cent. of lactic acid in the buttermilk developed at the normal temperature thereof. I then apply heat to produce rapid precipitation followed by fixation of the casein before any appreciably greater production of lactic acid takes place. Such heat is preferably applied in a steam or water jacketed kettle, in which the temperature may be accurately gaged, bringing the milk gradually to a temperature of about 140 degrees Fahr. This temperature with the named percentage of lactic acid causes the casein in the presence thereof to be precipitated. The kettle should also be provided with paddles or any other means for rapidly and thoroughly stirring the fluid.

In my process, therefore, as soon as the temperature begins to rise I violently agitate the mixture by the paddles or other means provided. As a result of the developing flocculent particles of precipitating casein have no opportunity to coalesce. Each particle follows its normal law of development and becomes separated from the other particles in a completely fixed or hardened condition, in which it will not adhere to other like particles. Instead, therefore, of a homogeneous curd I have an infinite number of separately formed non-adherent particles in suspension in the whey.

The process should be so timed that a pasteurizing or sterilizing temperature shall be maintained long enough to destroy all germs and particularly the lactic acid bacilli, thereby limiting the further production of lactic acid.

One object of my invention is attained at this point. The material is sterilized so that it no longer contains the germs which will produce further changes, and particularly those germs which will form lactic acid. But the heat sufficient to produce this condition and which ordinarily would have left the casein in the form of a continuous indigestible mass has only cooked the casein and left it in the form of an infinite number of minute particles. The resulting produce may be used and will be found an agreeable and wholesome potable food.

In forming a condensed product further steps may be taken as follows: The temperature of the milk in the condition described should now be raised to 172 degrees or more Fahr., at which the milk albumin will be coagulated, and remain in suspension in the whey. The object of coagulating the albumin is not only to conserve this valuable constituent of the milk, but to put the same in condition that it will not adhere to the utensils used in the further steps of the process.

After coagulation of the albumin, I conduct the fluid into evaporating pans, in which the water of solution is expelled *in vacuo* until the resulting product is reduced to about ⅛ in volume of the original milk. It then consists of extremely small non-adherent particles of precipitated casein with which are mingled the other solid constituents of the treated milk, and the lactic acid formed prior to that point in the process at which sterilization took place. It should be of a smooth and uniform consistency, and the constituent particles are in such condition that, upon the addition of water, they will be separated and remain in complete suspension and practically reproduce the milk originally treated. The said product, being sterilized, is further made self-preserving against fermentation by the lactic acid which it contains, amounting to from 3 to 3½ per cent. By reason of the acidity of the product, as well as the finely divided character of the particles, it is readily attacked by the digestive ferments in the ordinary course of digestion.

The material as described my be further treated to remove the remaining moisture and then mechanically reduced to small particles. It may be used as a food material either in the moist or dry condition or by the further addition of water to either form. But whether the product is left in the moist state or whether it is evaporated to dryness, the product and the process of preparing it are equally within the scope of my invention.

I claim:

1. The process of producing a food product from soured milk which consists in precipitating the casein by the agency of heat and simultaneously agitating the precipitate whereby the casein is mixed in the form of finely divided non-adherent particles.

2. The process of producing a food product from soured milk which consists in precipitating the casein by the agency of heat, simultaneously agitating the precipitate to keep the particles thereof out of continuous contact, and then increasing the heat to fix the said particles in finely divided non-adherent form.

3. The process of producing a food product from soured milk which consists in precipitating the casein by the agency of heat, agitating the precipitate while forming to keep the particles thereof out of continuous contact, and then increasing the heat fix the said particles in finely divided non-adherent form and sterilize the mass.

4. The process of producing a food product from soured milk which consists in precipitating the casein, agitating the precipitate to keep the particles thereof out of continuous contact and fix the said particles in finely divided non-adherent form and then evaporating the surplus fluid.

5. The process of producing a food product from soured milk which consists in precipitating the casein by the agency of heat, agitating the precipitate, heating the precipitated particles during agitation until they become non-adherent and then evaporating the surplus fluid.

6. The process of producing a food product from soured milk which consists in precipitating the casein by the aid of heat, agitating the precipitate while forming whereby the particles of casein are kept out of continuous contact and fixed so as to become non-adherent, and then evaporating the surplus fluid.

7. The process of producing a food product from soured milk which consists in precipitating the casein by the aid of heat, agitating the precipitate whereby the particles thereof are kept out of continuous contact and fixed so as to become non-adherent, coagulating the milk albumin, and then evaporating the surplus fluid.

8. The process of producing a food product from soured milk which consists in heating the milk to precipitate the casein, simultaneously agitating the milk to cause the precipitating casein to retain the form of minute discontinuous particles, increasing the heat to fix the said particles in discontinuous non-adherent form and to sterilize the mass, increasing the heat to coagulate the milk albumin, and then evaporating the surplus fluid.

9. The process of making an acid milk product which consists in developing in milk sufficient acidity to cause the casein to be precipitated, raising the same to sufficient temperature to sterilize it and fix the casein, agitating the milk while being so heated, coagulating the albumin thereof, and evaporating the surplus fluid.

10. An acid milk food product having a casein content in the form of minute precipitated, fixed, discontinuous, non-adherent particles.

11. An acid milk food product having a casein content in the form of minute precipitated, fixed, discontinuous, non-adherent particles, and containing a preservative quantity of lactic acid.

12. A sterilized acid milk food product having the casein thereof in minute precipitated, fixed, discontinuous, non-adherent particles.

13. An acid milk food product having a casein content in the form of minute, precipitated, fixed, discontinuous particles which are non-adherent in the presence of a substantially normal quantity of water.

14. The process of making an acid milk product which consists in developing in milk sufficient acidity to cause the casein to be precipitated, raising the same to sufficient temperature to sterilize it and fix the casein, and agitating the milk while being so heated.

In witness whereof, I have hereunto subscribed my name in the presence of two subscribing witnesses, this 22nd day of April, 1915.

WILLIAM P. M. GRELCK.

Witnesses:
C. K. CHAMBERLAIN,
A. S. PHILLIPS.

It is hereby certified that in Letters Patent No. 1,230,479, granted June 19, 1917, upon the application of William P. M. Grelck, of Evanston, Illinois, for an improvement in "Self-Preserving Acid Milk Products and Processes of Making the Same," errors appear in the printed specification requiring correction as follows: Page 2, line 33, strike out the word "of"; same page, line 60, for the word "produce" read *product;* same page, line 116, claim 1, for the word "mixed" read *fixed;* and that the said Letters Patent should be read with these corrections therein that the same may conform to the record of the case in the Patent Office.

Signed and sealed this 18th day of September, A. D., 1917.

[SEAL.]

R. F. WHITEHEAD,
*Acting Commissioner of Patents.*

Cl. 99—11.

DISCLAIMER.

1,230,479.—WILLIAM P. M. GRELCK, Evanston, Ill. Self-Preserving Acid Milk Product and Process of Making the Same. Patent dated June 19, 1917. Disclaimer filed February 3, 1928, by the assignee by mesne assignments, GRELCK-HOVEY PATENT COMPANY, with approval of licensee, CONSOLIDATED PRODUCTS CO.

Hereby disclaim all matter described in lines 100 to 110 of page 2 of the specification, which paragraph is hereby cancelled; from the scope of claims 1, 2, 3, and 14 only and from no other claims any process for producing a food product consisting substantially wholly of buttermilk, and from the scope of claims 10, 11, and 12 any food product except concentrated moist products, and from the scope of claim 13 any food product consisting substantially wholly of the constituents of buttermilk.

(Official Gazette February 21, 1928.)